March 7, 1933.                H. F. KRUG                1,900,568
                            PNEUMATIC TUBE
                         Filed Nov. 27, 1931
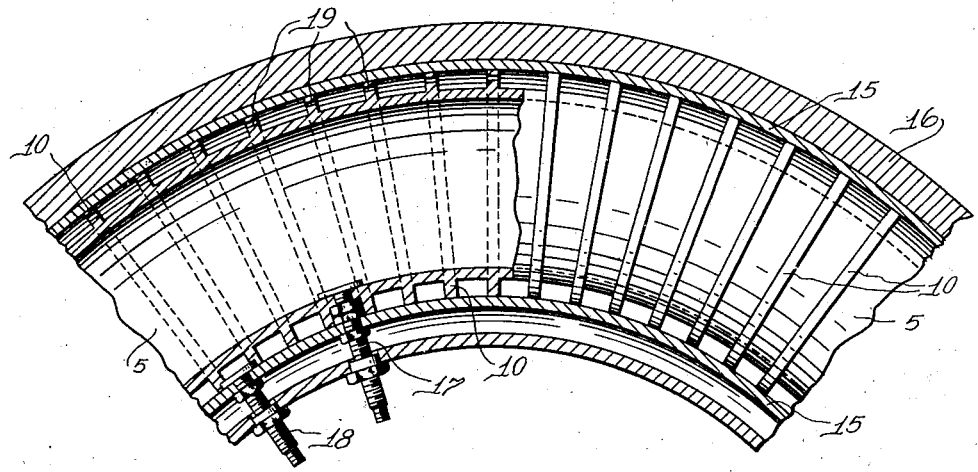
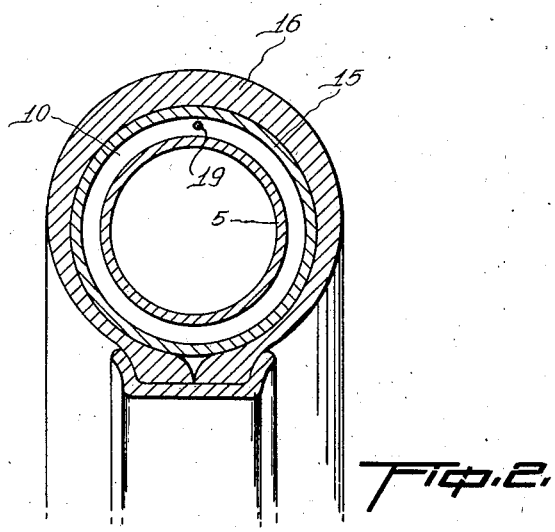
INVENTOR
Harold F. Krug
BY
ATTORNEYS Patented Mar. 7, 1933

1,900,568

UNITED STATES PATENT OFFICE

HAROLD F. KRUG, OF GROSSE POINTE PARK, MICHIGAN

PNEUMATIC TUBE

Application filed November 27, 1931. Serial No. 577,487.

My invention relates to pneumatic tires and more particularly to an improved pneumatic tube.

An object of the present invention is to provide a pneumatic tire structure wherein the pneumatic tube is provided with a circumferentially extending chamber which spaces the tube from the walls of the tire shoe so as to float therein.

A further object of the invention is to provide a pneumatic tube having an inner air chamber which is surrounded by an outer air chamber which serves to insulate the inner chamber from the tire shoe and thereby counteract the heat developed by the latter incident to its contact with the road.

With the preceding and other advantages in mind the invention consists in the novel combination of elements, constructions, arrangements of parts and operations to be hereinafter specifically referred to, claimed and illustrated in the accompanying drawing, wherein Figure 1 is a fragmentary sectional view of my improved pneumatic tube arranged within the tire shoe or casing, and Fig. 2 is a transverse sectional view of the same.

Referring to the invention in detail an inner tube which is circular in cross section is provided and formed on the periphery thereof at spaced intervals is a plurality of circumferential ribs or walls 10. An outer pneumatic tube 15 receives the inner tube 5 and its ribs 10 and is vulcanized or otherwise secured to the latter. The outer tube 15 is in direct contact with the interior of the walls of the tire shoe 16 and is supported in spaced relation to the inner tube 5 by these ribs 15. As shown the air space between the outer tube 15 and the inner tube 5 is relatively small as compared with the cross sectional area of the tube 5 and affords an air chamber between these tubes 5 and 15.

In order to conduct air pressure to the inner tube 5 and the air chamber between this inner tube and the outer tube air valves 17 and 18 are provided, the former opening directly into the inner tube 5 while the latter passes through the walls of the tube 15 and opens into the air chamber above mentioned. A plurality of transverse openings 19 is provided in the ribs 10 so that air entering the air chamber will be unobstructed and inflate the entire area of the outer tube 15.

If desired, the inner tube may contain less pressure than the air chamber between the inner tube and outer tube so that the pressure contained in the air chamber will operate to float the inner tube 5. Moreover the air chamber completely enveloping the inner tube 5 provides an insulation for the tube 5 to protect the same from the heat radiated by the tire shoe. Also by having the inner tube as above stated less friction is produced between the tread of the tire and roadway, and consequently the speed of the vehicle will be materially increased.

It will also be observed that in the event the outer tube 15 is punctured the tube 5 will function to sustain the tire and prevent same from becoming entirely deflated.

In lieu of the shoe disclosed in Fig. 2 the invention also contemplates the use of a shoe whose clencher beads come together and close the space at the underside of the tube.

What I claim is:—

A pneumatic tire comprising an outer casing forming a tire shoe, an outer pneumatic tube within said shoe in contact with the wall thereof, an inner pneumatic tube within said outer tube and formed with integral external annular ribs extending transversely of said inner tube completely around the same and across said space between said tubes, said ribs being spaced apart and secured at their outer side edges to said outer tube to form annular air chambers between said inner and outer tubes, said ribs being apertured to place said chambers in communication with each other and separate means for inflating each of said tubes.

In testimony whereof I affix my signature.

HAROLD F. KRUG.